No. 799,670. PATENTED SEPT. 19, 1905.
G. H. REYNOLDS.
TUBE BENDING MACHINE.
APPLICATION FILED FEB. 12, 1904.
9 SHEETS—SHEET 4.
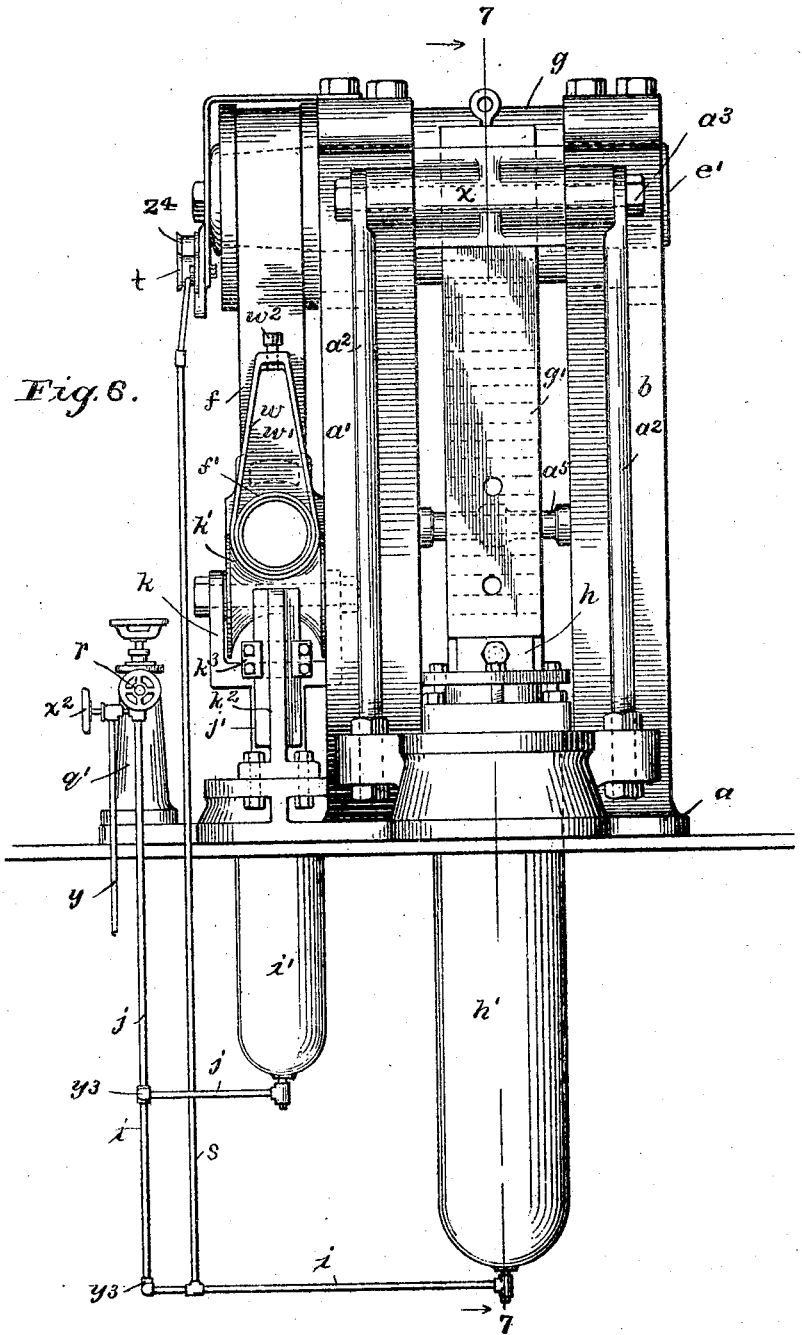
Witnesses
Chas. H. Ebert
Hermann Lechner
Inventor
George H. Reynolds
By Paul Synnestvedt
Attorney No. 799,670. PATENTED SEPT. 19, 1905.
G. H. REYNOLDS.
TUBE BENDING MACHINE.
APPLICATION FILED FEB. 12, 1904.

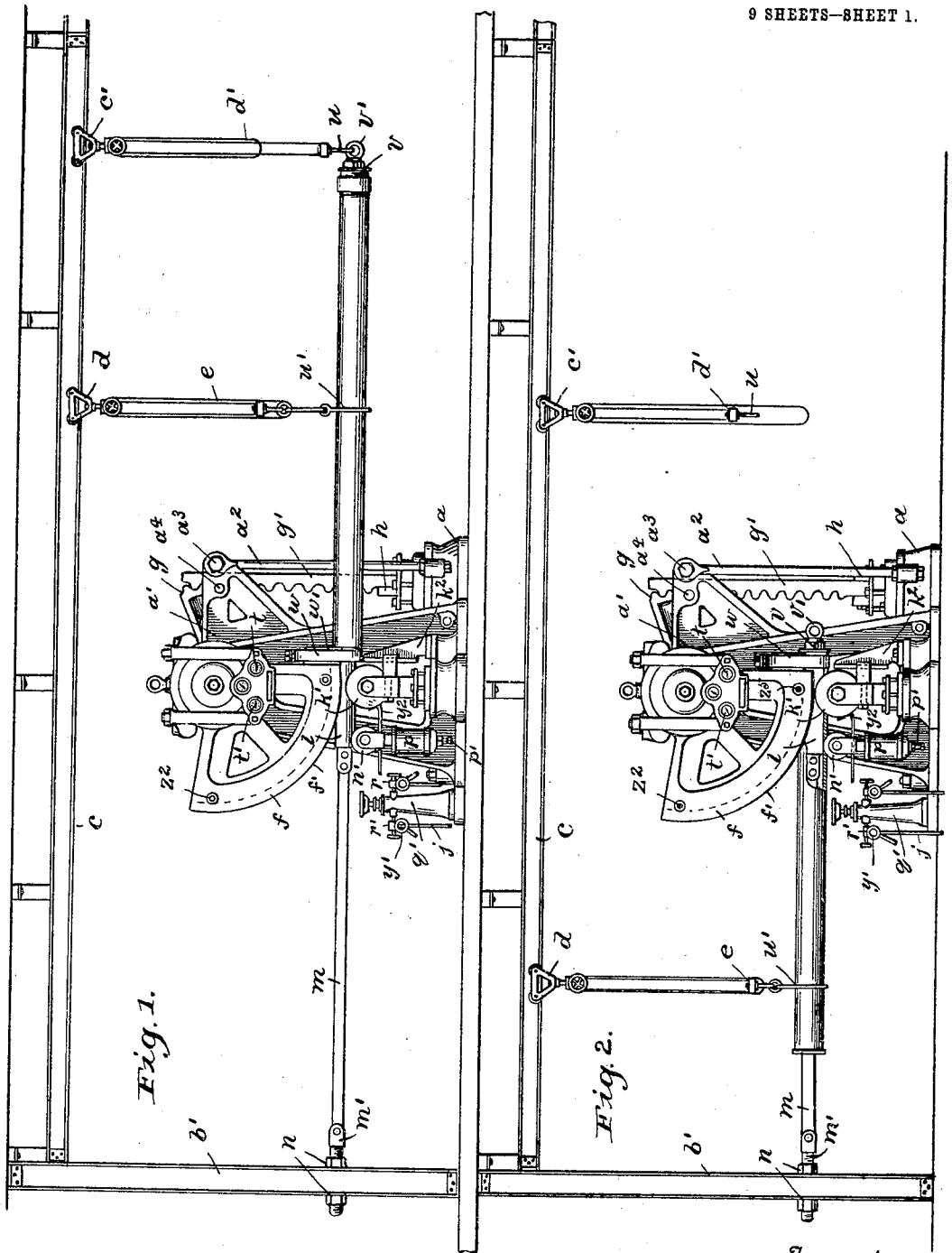

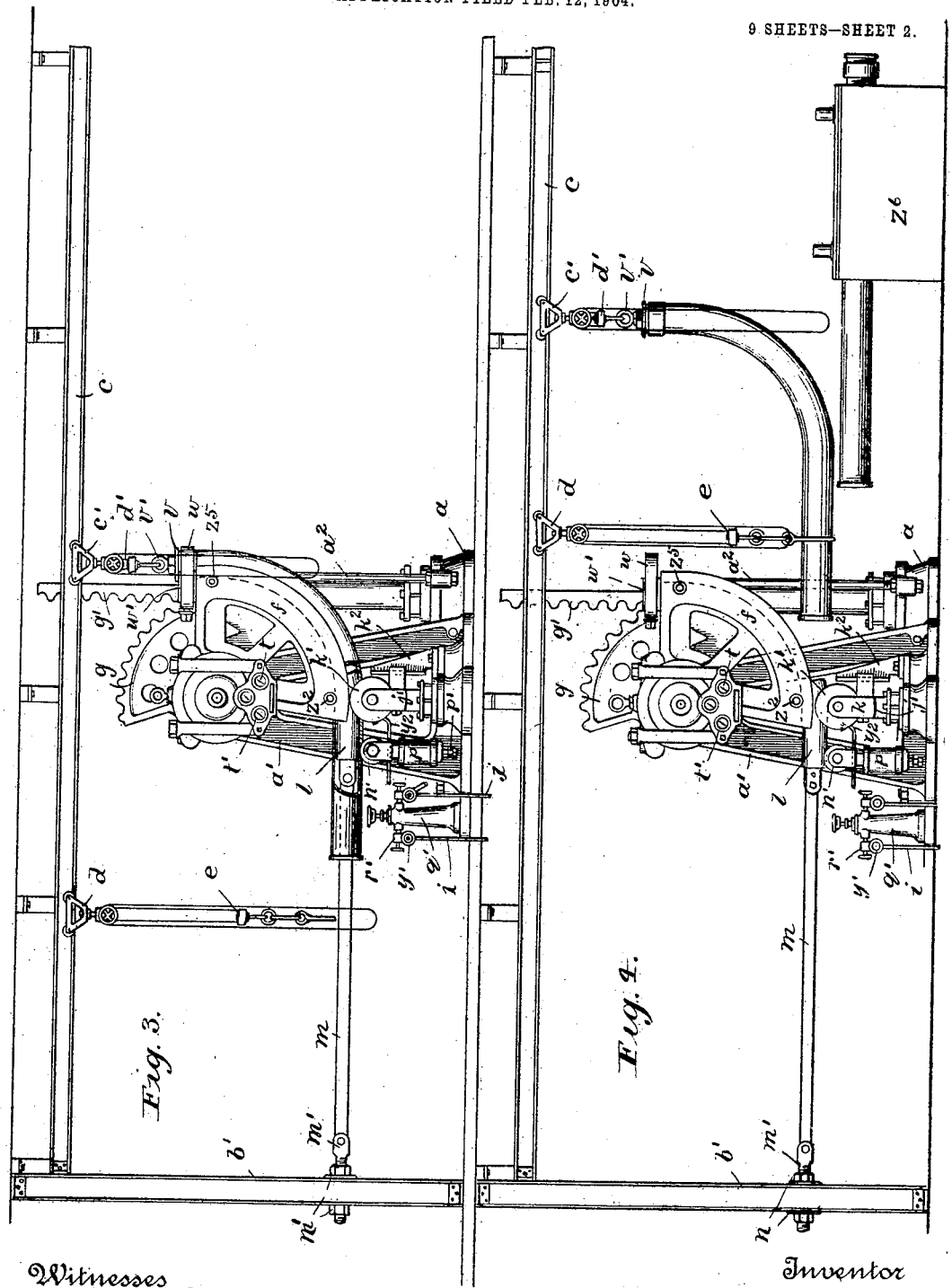

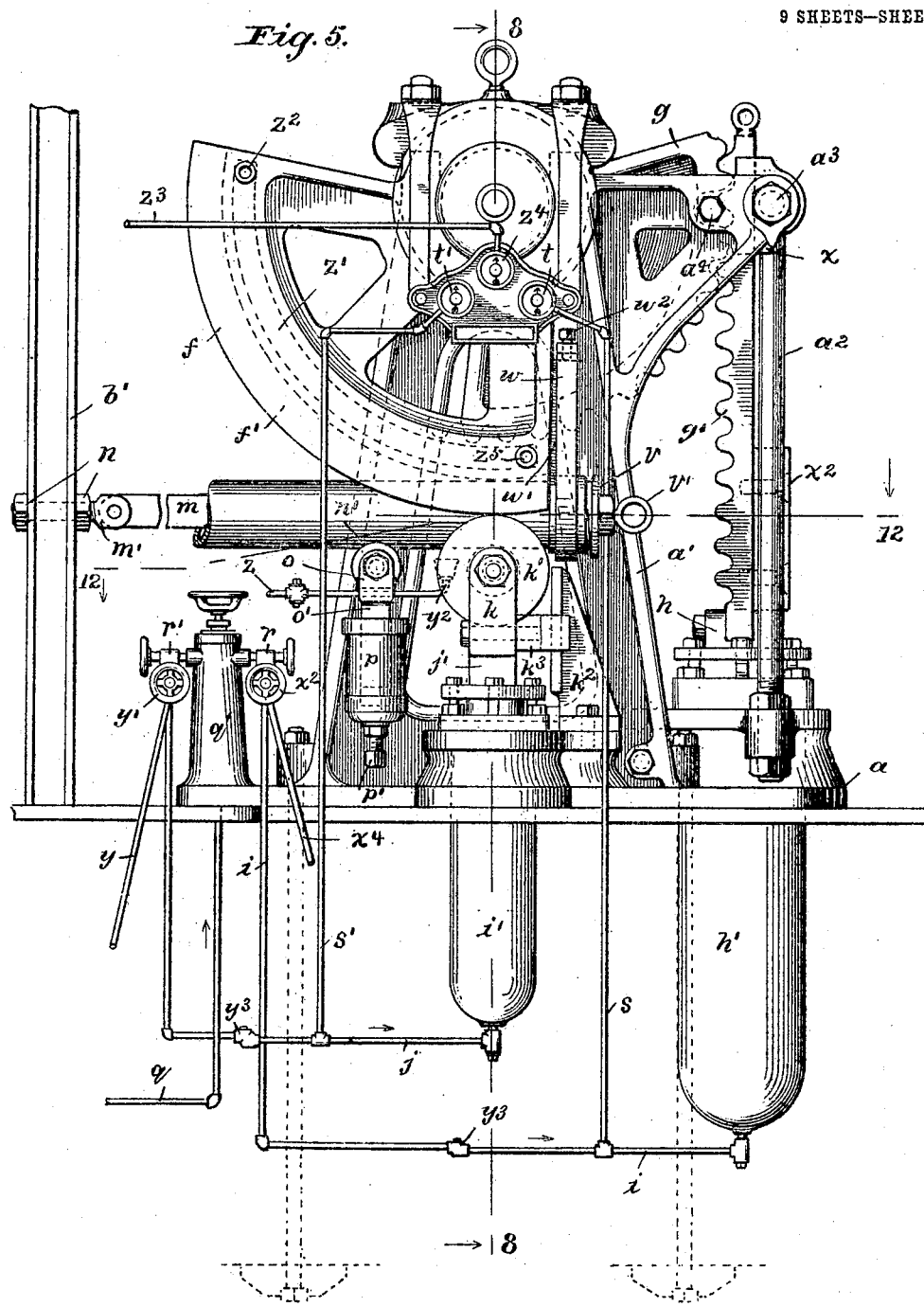

Witnesses
Chas. H. Ebert
Hermann Lochner

Inventor
George H. Reynolds
By
Paul Synnestvedt
Attorney.

No. 799,670. PATENTED SEPT. 19, 1905.
G. H. REYNOLDS.
TUBE BENDING MACHINE.
APPLICATION FILED FEB. 12, 1904.

Witnesses
Chas. H. Ebert
Hermann Lechner

Inventor
George H. Reynolds
By Paul Synnestvedt
Attorney

No. 799,670. PATENTED SEPT. 19, 1905.
G. H. REYNOLDS.
TUBE BENDING MACHINE.
APPLICATION FILED FEB. 12, 1904.

Witnesses
Chas. H. Ebert
Hermann Lochman

Inventor
George H. Reynolds
By
Paul Synnestvedt
Attorney

UNITED STATES PATENT OFFICE.

GEORGE H. REYNOLDS, OF MANSFIELD, CONNECTICUT, ASSIGNOR OF ONE-HALF TO CRANE COMPANY, OF CHICAGO, ILLINOIS, A CORPORATION OF ILLINOIS.

TUBE-BENDING MACHINE.

No. 799,670.  Specification of Letters Patent.  Patented Sept. 19, 1905.

Application filed February 12, 1904. Serial No. 193,271.

*To all whom it may concern:*

Be it known that I, GEORGE H. REYNOLDS, a citizen of the United States, residing at Mansfield, in the State of Connecticut, have invented certain new and useful Improvements in Tube-Bending Machines, of which the following is a specification.

This invention relates to machines for bending metal pipes in general, but especially for bending wrought metal pipes of large diameters.

Heretofore it has been very troublesome and expensive to bend pipes of this character having a diameter of say five inches or more, the usual method having been to fill the pipe with sand, plug the ends and heat the whole pipe before bending it, consuming much time, requiring the services of several men and of course, involving great expense.

The object of my invention is to provide a machine for bending pipes or tubes, which will dispense with the customary operations of filling the pipe with sand, and heating the whole pipe; to save the greater part of the labor of the operation; to permit of bending the pipe either entirely cold, or heated on one side only, and to construct an efficient machine which will be compact in itself, require a comparatively small amount of floor space in its operation, and act with uniformity.

I attain these objects and other advantages by means of the improved construction, arrangement and combination of parts of a pipe machine fully described hereinafter, and shown in preferred form in the accompanying drawings, wherein—

Figure 1 represents my machine in side elevation, the parts being in a proper position to receive the pipe, which is shown suspended and ready to be fed into the machine;

Figure 2 is a similar view with the pipe inserted between the bending elements;

Figure 3 shows a similar view, with the parts in the position assumed at the end of the bending of the pipe to an angle of ninety degrees;

Figure 4 is a similar view, with the parts in a position nearly like that of Figure 3, but with the bent pipe removed from the machine and another pipe approaching from the furnace ready for bending;

Figure 5 shows on an enlarged scale, a side elevation of the machine as seen in Figure 2, with a pipe in the machine ready to be bent, parts being omitted and other parts broken away;

Figure 6 represents an end elevation of the machine, looking from the right hand side as seen in Figure 5;

Figure 11:
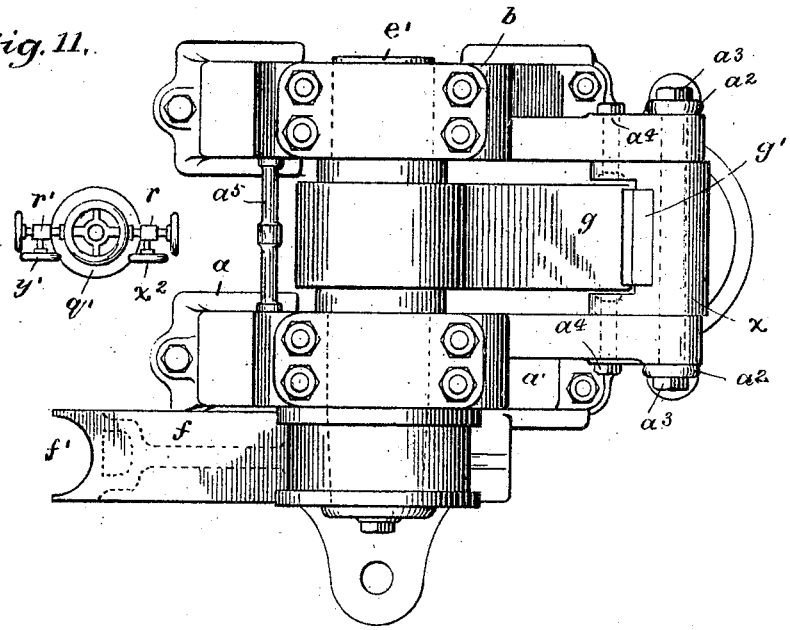
Figure 11 is a top plan view of my machine.
Figure 12:
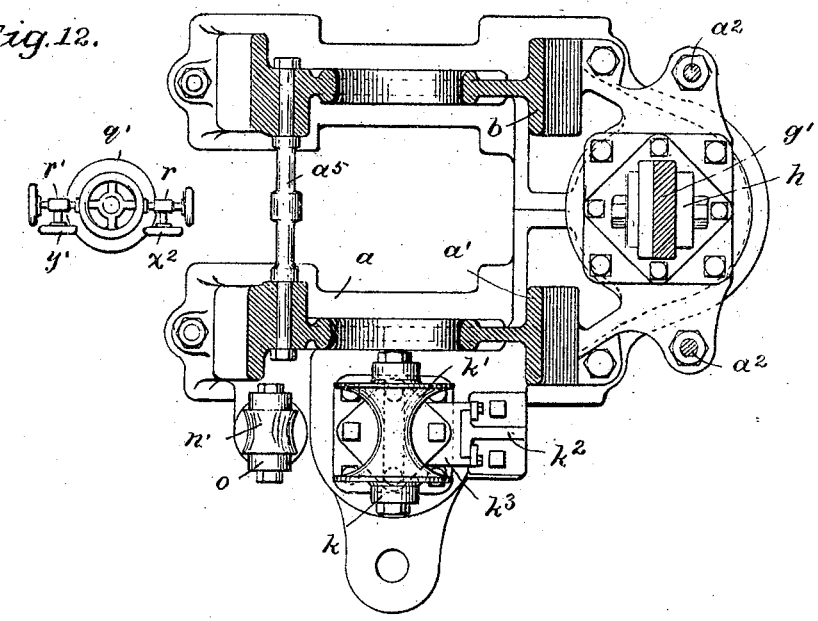
Figure 12 is a horizontal sectional view of the machine along the broken line 12-12 of Figure 5, looking downward, and with parts omitted.
Figure 13:
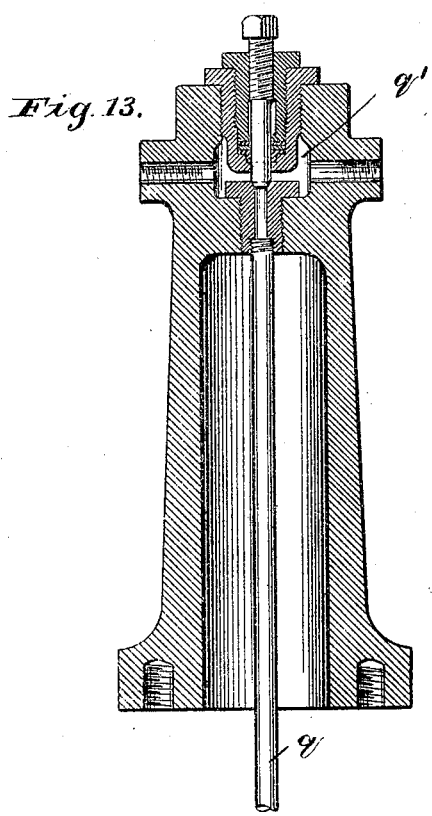
Figure 13 is a central vertical section of the distributing chamber shown in the several figures.

In the drawings, $a$ indicates the base of the machine from which arises side framing or standards $a'$, $b$, between which some of the operative parts are mounted, the base being suitably secured to a floor, or it might be a platform, and being provided with openings through which certain parts hereinafter described pass below into suitably provided spaces. These standards are tied together on one side by a bar $a^5$, and on the other side by the stop $x$, which is inserted between brackets of said standards. This stop is constructed so as to relieve the frame of strain from the piston as much as possible, and also forms a guide for the rack bar $g'$. In addition to the long bolt $a^3$, the stop contains two smaller bolts $a^4$, one on each side, which are employed to more rigidly tie the stop in place, as is clearly apparent in Figures 5 and 11. I also employ tie bars $a^2$ on each side of the rack between the brackets and the base to strengthen the former, by tying them down to the cylinder which operates the piston against the stop.

From the floor arise suitable posts in front and rear of the machine only one of which is shown, at $b'$ in Figures 1 to 5 inclusive, said posts supporting longitudinal beams and rails $c$ passing over the machine upon which rails travel trolleys $c'$ and $d$ and from which depend pulley and cable hoisting mechanism as at $d'$ and $e$ for supporting and carrying the pipes before entering and after leaving the machine, and as shown in Figure 2, for supporting the pipe while in the machine.

Figure 7:
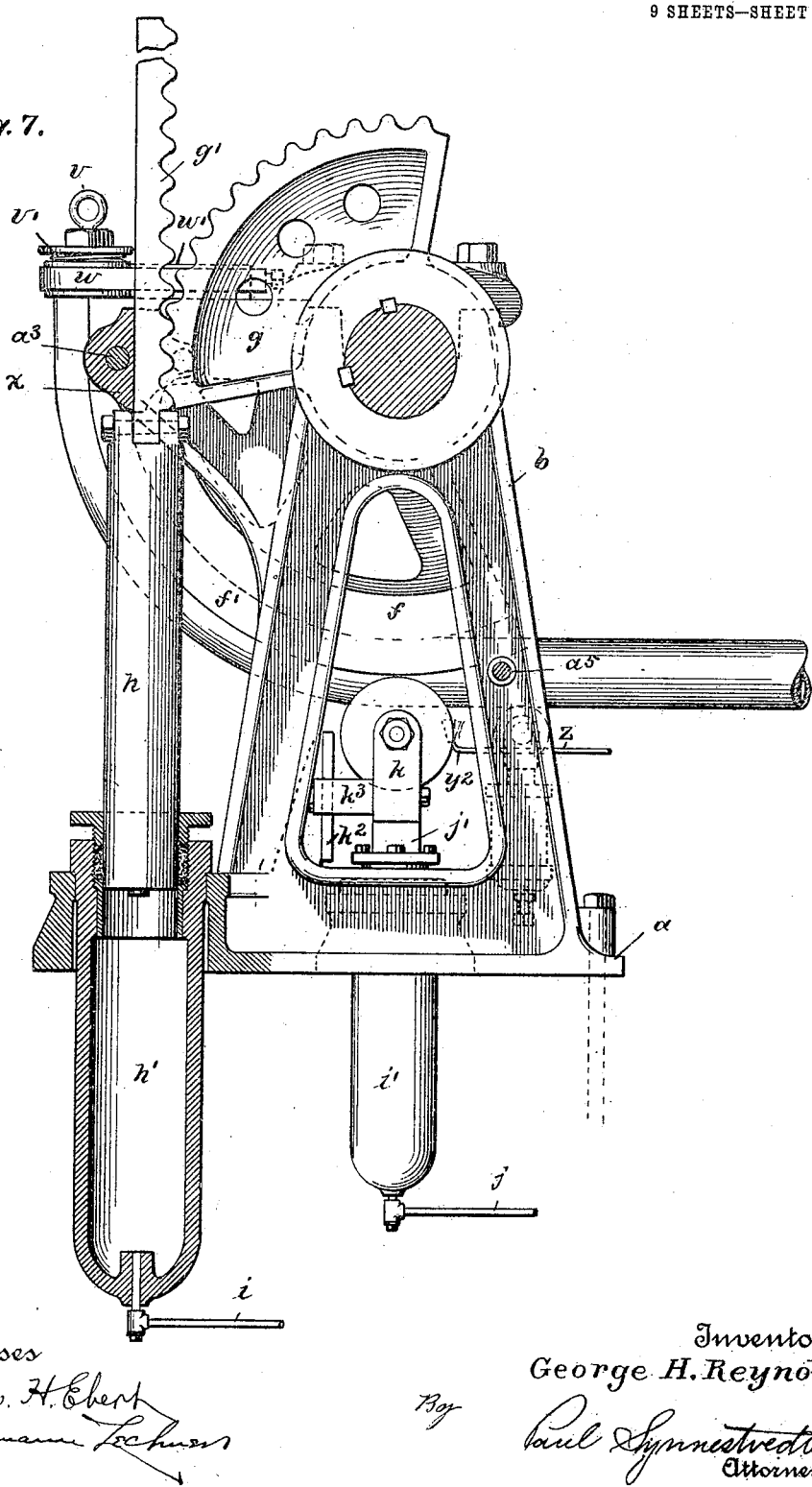
Figure 7 represents a longitudinal vertical section through the machine taken on line 7-7 of Figure 6.
Figure 8:
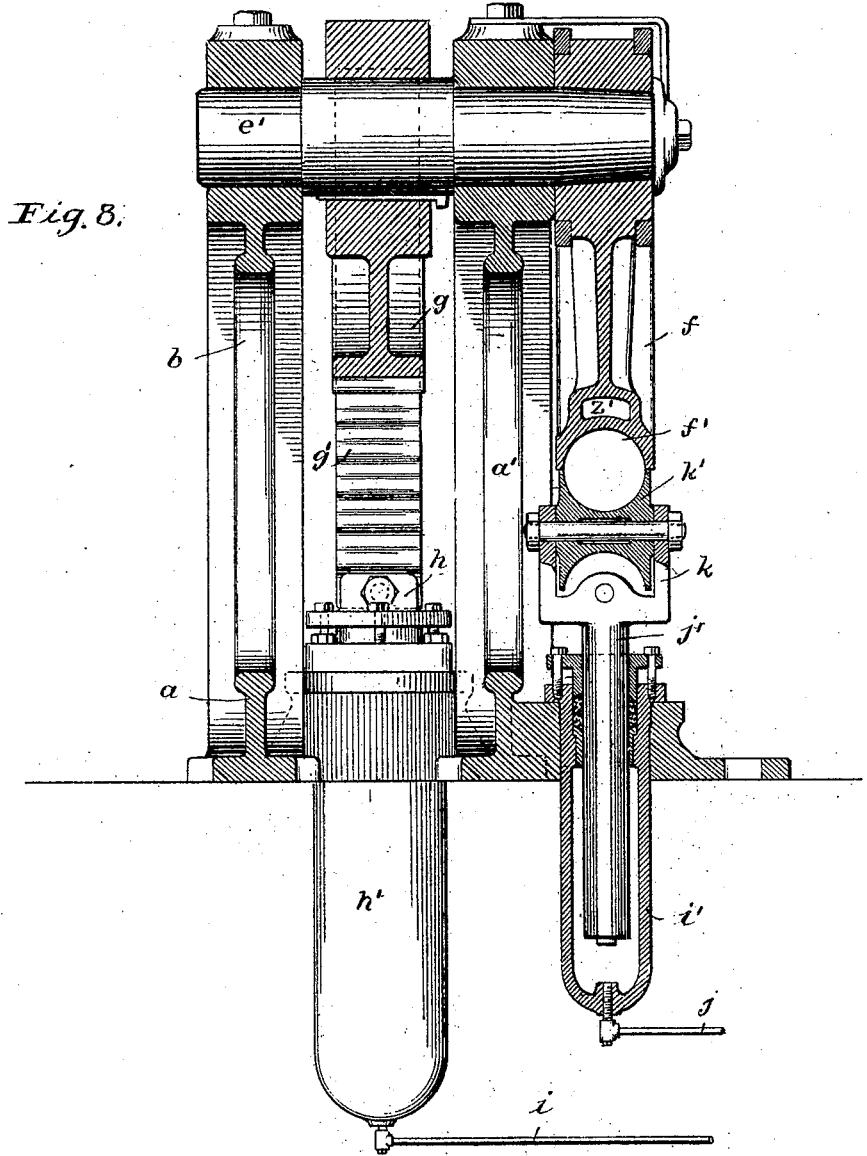
Figure 8 shows a transverse vertical sectional view looking toward the right and taken on line 8-8 of Figure 5.

In bearings in the upper part of standards $a'$ and $b$ is journaled a heavy shaft $e'$ upon which in front of the standard $a'$, is rigidly secured a heavy segmental die $f$, having in its periphery a groove $f'$ substantially semi-circular in cross section, to receive the pipe which it bends around itself and the mandrel $l$, which is held in substantially a fixed position. On the same shaft, between the standards is rigidly secured a segmental rack $g$, whose teeth mesh with those of the vertical rack bar $g'$ fitted in a guide of the stop $x$ and mounted upon the piston $h$ (see Figure 7) which operates in a hydraulic cylinder $h'$ supplied through a pipe $i$. A second cylinder $i'$ having a piston $j'$ and actuated by fluid fed through pipe $j$ is provided for operating a pressure roller $k'$ of the same thickness as the segment $f$ and provided with an annular groove similar in shape and size to the groove in the segment $f$, so that when the segment and pressure roller are brought together, the two grooves form a space circular in cross section. The heavy lateral thrust upon this roller $k'$ is provided for by a bracket $k^2$ secured to the base and having a vertical faced way on which brace $k^3$ of head $k$ is slidably fitted in a manner to stiffen the head for the roller, yet permits the head and roller to freely move up and down in its operation.

Figure 9:
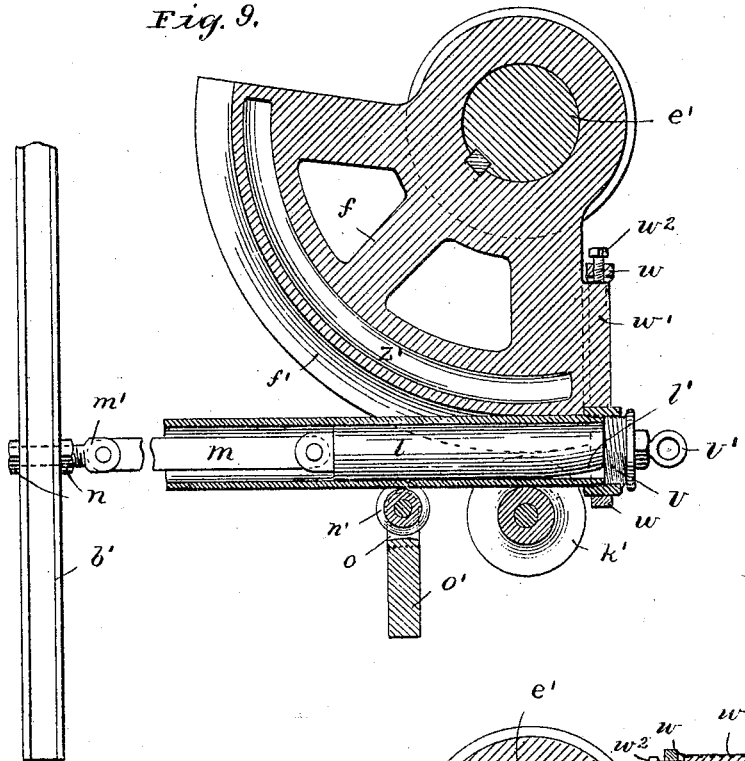
Figure 9 is a detail section of the segment and co-operating parts and a pipe therein ready to be bent.
Figure 10:
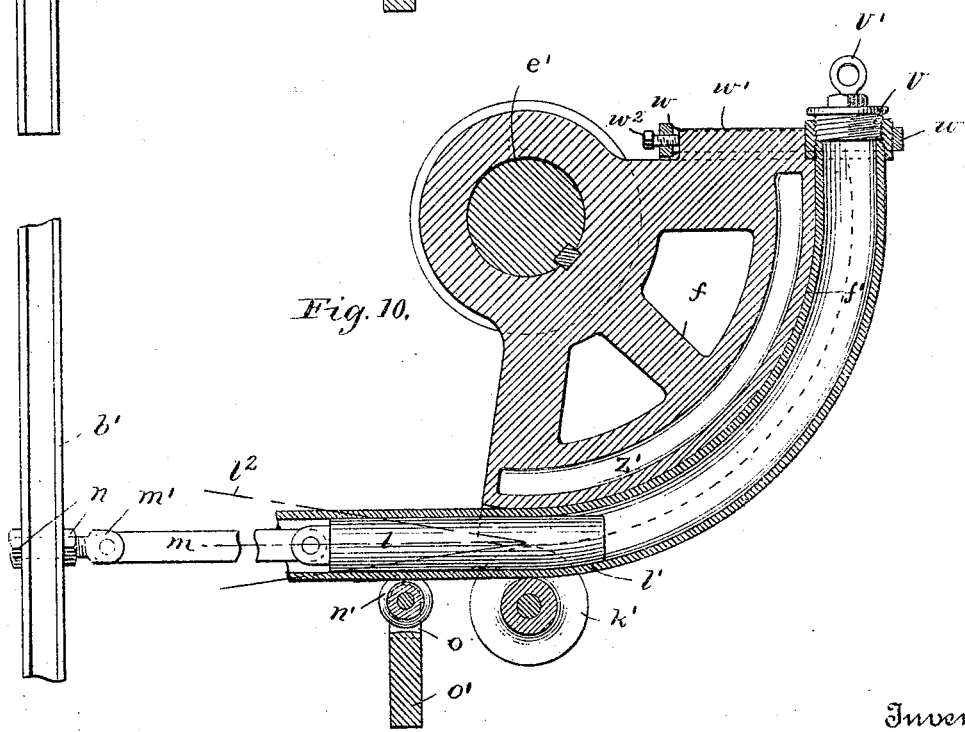
Figure 10 is a similar view of the same parts with a pipe bent to an angle of ninety degrees.

The pressure roller is normally down a short distance, and in the space between it and the segment, is loosely held a plug or short mandrel $l$, whose lower forward edge is beveled and rounded off, as at $l'$, the rounding in the longitudinal line being in the arc of a circle substantially concentric with the periphery of the segmental die $f$ (see Figures 9 and 10) when the mandrel is held horizontal. This mandrel is pivotally attached to the end of a rod $m$ which is pivotally attached at its opposite end to a screw $m'$ passing between two channel beams, which are arranged back to back, and form the post or standard $b'$. Upon the screw, on opposite sides of the post, are two nuts and washers $n$, by means of which the screw may be adjusted vertically and firmly clamped in any adjustment.

The tendency of the rolls $k'$ and $n'$ operating as they do in conjunction with the mandrel against the pipe, is to not only prevent the buckling of the pipe on the top side but also prevents the flattening of the pipe on the underside, and the action of the rolls on the outside serves to lengthen that side and thus assist in the bending operation.

In the rear of the pressure roller $k'$ and in the same vertical plane as the pressure roller and the segment $d'$, is a supporting roller $n'$ grooved similarly to the pressure roller and segment, and journaled in the head $o$ of a cylindrical rod $o'$ mounted to slide in a cylinder $p$ and adjusted vertically by means of a screw $p'$ projecting through the bottom of the cylinder.

Fluid under pressure from any suitable source is supplied through a pipe $q$ to a chamber $q'$ from which it may be admitted to cylinder $h'$ through pipe $i$ by means of valve $r$, and to cylinder $i'$ through pipe $j$ by means of a valve $r'$, there being a branch pipe $s$ from pipe $i$ and a branch pipe $s'$ from pipe $j$ leading respectively to gages $t$ and $t'$ whereby the pressure in cylinders $h'$ and $i'$ can always be known (see Figure 5).

The mechanism thus far described is sufficient to bend a cold pipe to the extent of ninety degrees or less, and its operation is as follows:—

A straight pipe is first supplied with a plug $v$ in its end bearing a ring $v'$ and is supported from trolley $c'$ and $d$ by means of a hook $u$ to engage said ring and a suitable loop $u'$, which encircles the pipe. The pipe in this position (see Figure 1) is passed into the opening made by the grooves of the segment $f$ and pressure roller $k'$ upon the mandrel $l$ and over the mandrel rod $m$ until it reaches the position illustrated in Figures 2 and 5, having also passed through a loop $w$ mounted on a boss $w'$ formed on the front face of the segment and adjustable by a screw $w^2$. In this position the pipe rests on the supporting roller $n'$ which was previously adjusted to position to suit the pipe, and is held up by the block and cable mechanism suspended from trolley $d$. The pipe at its forward end is now released from its supporting tackle and securely clamped to the segment by turning up the screw $w^2$ and is ready to be bent. Water is now admitted into cylinder $i'$ in the manner described, forcing up the pressure roller $k'$ and firmly holding the pipe at the point wherein is the mandrel against the segment. Water is now admitted into cylinder $h'$ in the manner described, which forces up the rack bar $g'$ and oscillates the segment rack carrying with it the shaft $e'$ and segment $f$. The pipe is drawn along with the segment until the limit of the bend is reached, and for a full bend of ninety degrees the segment is stopped by the head of the piston coming in contact with a cross stop $x$ on the frame (see Figure 7). If a bend of less than ninety degrees is desired, a stop bar $x^2$ (Figure 5) of a suitable length and marked with the number of degrees the pipe is to be bent, is secured to the rack bar prior to the operation and by its contact with the stop $x$, the degree of bend is actually determined. Should a bend of more than ninety degrees be required, as indicated by dotted line $l^2$ in Figure 10, the supporting roller $n'$ is adjusted by means of the screw $p'$ any predetermined distance higher than for a ninety degree bend and the mandrel $l$ and rod $m$ correspondingly adjusted by moving the screw $m'$ higher up, thus tilting the forward end of the mandrel downward, and consequently giving the unbent pipe a position at an inclination to the horizontal with its forward end lowest. The full movement of the segment now is made which carries the forward end of the pipe to a perpendicular position or more than ninety degrees from the position in which the unbent portion of the pipe is held, thus bending beyond the ninety degrees.

After any bend is completed, the loop $w$ is loosened and removed, the pressure roller lowered and the hook $u$ engaged in the ring $v'$ and the pipe drawn out far enough to engage the loop $u'$ about it (see Figure 4) when it may be removed to any desired position, and the plug $v$ removed from it.

Figure 14:
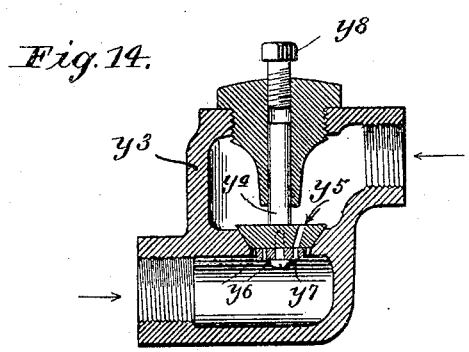
Figure 14 is a central vertical section of a special form of check-valve, which I employ in the pipe connection between the water supply and the cylinder.

To lower the rack bar, the pressure is exhausted from cylinder $h'$ through pipes $i$ and and $x^4$ by opening a valve $x^2$; and to lower the pressure roller $k'$ pressure is exhausted from cylinder $i'$ through pipes $j$ and $y$ by opening a valve $y'$. Both the pipes $i$ and $j$ contain a special form of check valve $y^3$, shown in enlarged view in Figure 14, which contains a valve proper $y^4$, against which the water pressure is applied, and having a small hole $y^5$ therethrough with an adjustable disk $y^6$ pivoted thereto and bearing holes $y^7$ of different sizes to register with the holes $y^5$ of the valve. This construction affords means for adjusting the size of the opening and the supply of water through the valve for raising the piston while the valve is down. The return of the pistons is permitted by the operation of the valves $x^2$ and $y'$, which exhausts the water more quickly with the raising of the valve $y^5$ from its seat thus insuring a quick lowering motion to the piston of either cylinder, which speed may be regulated by the adjustment of screw $y^8$.

Figure 15:
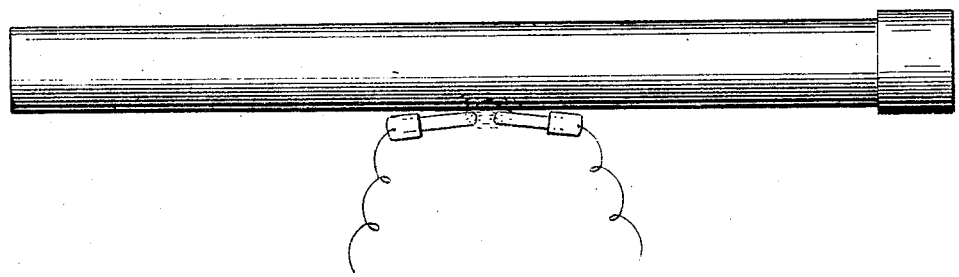
Figure 15 is a diagram view illustrating a manner of heating one side of the pipe by electricity.

Should it be deemed desirable to heat a pipe before bending, I provide a gas jet $y^2$ fed through a pipe $z$ (see Figure 5) or an electric heater as shown in Figure 15, the flame of both of which bears against the bottom side of the pipe and heats it, while the segment is cooled by passing water through a chamber $z'$ formed in it (see Figures 5, 6, 9 and 10) the water being admitted through $z^2$ (Figure 3) through a flexible hose connected with pipe $z^3$, (the pressure in which is shown on gage $z^4$) and discharged through opening $z^5$ through a flexible connection with any suitable waste pipe.

Instead of a gas jet or electric heater I may use a furnace or heating chamber $z^6$, (see Figure 4) for heating the bottom of the pipe before passing it into the machine.

From the foregoing it will be seen that I have constructed a vertically operating machine which is so arranged and balanced that a single cylinder may be employed for operating the bending segment, and that when the pressure is released therefrom it will automatically return to its normal position.

While I have specifically described the construction, arrangement and operation of the various parts composing my machine, I desire it to be understood that I do not limit myself thereto, it being obvious to those skilled in the art that many changes and variations might be made therefrom without departing from the spirit and scope of my invention.

Having thus described my invention and illustrated its use, what I claim as new and desire to secure by Letters Patent, is the following:

1. In a pipe bending machine, the combination of a pivoted grooved segment, a similarly grooved pressure roller mounted in the same plane, a mandrel normally held in horizontal position between the segment and roller, adjusting means for tilting the mandrel in the plane of the bend and holding it in a tilted position, means for clamping a pipe held on the mandrel to the front edge of the segment, and means for oscillating the segment, substantially as described.

2. In a pipe bending machine the combination of a pivoted grooved segment, a similarly grooved pressure roller mounted in the same plane, a mandrel normally held in position between the segment and roller, means for clamping a pipe held on the mandrel to the front edge of the segment, hydraulic means for oscillating the segment, and stops to limit the oscillation for varying the extent of the bending automatically, substantially as described.

3. In a pipe bending machine, the combination of a shaft, a grooved segment secured thereto, a grooved pressure roller co-operating with the segment to hold a pipe between them, means for clamping the pipe to the forward edge of the segment, a segmental rack on the shaft, a rack bar engaging therewith, and means for reciprocating the rack bar to oscillate the segmental rack, the shaft and the grooved segment, substantially as described.

4. In a pipe bending machine, the combination of a shaft carrying a bending segment, a segmental rack secured to the shaft, a rack bar engaging the segmental rack, a piston and rod upon which said rack bar is secured, a mandrel means for moving the piston to oscillate the segment, and a rigid stop to limit the extent of said oscillation, and adjustable means to vary the angle of the mandrel, substantially as described.

5. In a pipe bending machine, the combination of an oscillatory grooved segment, a pressure roller co-operating therewith, a mandrel normally held in horizontal position between the roller and segment, and adjustable means for holding the mandrel in the plane of the bend, substantially as described.

6. In a pipe bending machine, the combination of a co-operating grooved segment and grooved pressure roller, a post, a screw vertically adjustable in the post, means for securing it when adjusted, a rod pivotally secured to the screw, and a mandrel pivotally secured to the rod and resting between the segment and pressure roller, substantially as described.

7. In a pipe bending machine, the combination of a co-operating grooved segment and grooved pressure roller, a post, a screw vertically adjustable in the post, means for securing it when adjusted, a rod pivotally secured to the screw, a mandrel pivotally secured to the rod and resting between the segment and pressure roller, and an adjustable supporting roller in the plane of the segment and pressure roller, substantially as described.

8. In a pipe bending machine, the combination of an oscillatory grooved segment, a mandrel, a grooved pressure roller co-operating with the segment to hold a pipe on the mandrel between them, and electric means for locally heating one side of the pipe while on the mandrel, substantially as described.

9. In a pipe bending machine, the combination of an oscillatory grooved segment, a mandrel, a grooved pressure roller co-operating with the segment to hold a pipe on the mandrel between them, means for heating one side, and means for cooling the other side of the pipe while on the mandrel, substantially as described.

10. In a pipe bending machine, the combination of an oscillatory grooved segment, a mandrel, a grooved pressure roller co-operating with the segment to hold a pipe on the mandrel between them, and means for cooling the segment to cool the contacting pipe, substantially as described.

11. In a pipe bending machine, the combination of an oscillatory grooved segment, a mandrel, a grooved pressure roller co-operating with the segment to hold a pipe on the mandrel between them, and means for heating one side of the pipe, and means for cooling the segment to cool the other side of the pipe, substantially as described.

12. In a pipe bending machine, the combination of a vertically operating segment grooved in its periphery to conform to the section of pipe, a similarly grooved presser roller in line with and fixed beneath the segment, a mandrel interposed between the segment and presser roller, means for clamping a pipe to the segment, and hydraulic means for oscillating the segment to draw the pipe against and over the roller with the movement of the segment.

13. In a pipe bending machine, the combination with a suitable frame, of a shaft mounted therein carrying a bending segment, a segmental rack secured to the shaft, a rack bar engaging the segmental rack, a guide stop for the rack arranged between side standards of the frame, a piston upon which said rack bar is secured, a cylinder for moving the piston to oscillate the segment, tie rods interposed between the cylinder and the guide stop for the rack, substantially as described.

14. In a pipe bending machine, the combination of a frame comprising in part standards with brackets projecting therefrom, a guide stop secured intermediate of said brackets tie rods interposed between said brackets and the base of the frame to strengthen the structure, a shaft journaled in the standards carrying a bending segment, a segmental rack secured to the shaft, a rack engaging the segmental rack, a piston connected with the rack, and means for moving the piston to oscillate the segment, substantially as described.

15. In a pipe bending machine, the combination of a shaft carrying a bending segment, a segmental rack secured to the shaft, a rack bar engaging the segmental rack, a piston upon which said rack bar is secured, means for moving the piston to oscillate the segment, and stops for varying the stroke of the piston and the oscillatory movement of the segment to bend a pipe to any degree desired.

16. In a pipe bending machine, the combination of a segment grooved in its periphery to conform to a section of pipe, a similarly grooved hydraulic presser roller carried in a head and mounted in the plane of the segment, a fixed bracket adjacent to the roller, a brace interposed between the brackets and head to stiffen the latter, a mandrel arranged between the segment and roller, and hydraulic means for moving the segment and pipe forward against the roller to bend and form the pipe.

17. In a pipe bending machine, the combination of a vertically operating segment grooved in its periphery to conform to a section of pipe, a similarly grooved roller in line with the segment, a segmental rack connected with the segment, a single cylinder for operating said rack and segment in a forward direction, said parts being so arranged vertically as to return to a normal position by gravity when the pressure of the cylinder is released.

18. In a pipe bending machine, the combination of a grooved segment mounted vertically on a horizontal shaft, a segmental rack mounted upon the same shaft extended from an adjoining quarter, a rack and piston hung vertically from said segmental rack to operate the same in a forward direction by pressure and in a backward direction to a normal position by reason of the excessive weight of the rack and piston carried on the segmental rack.

19. In a pipe bending machine the combination with a bending segment operating in a vertical plane, of a rack and actuating hydraulic cylinder and piston for operating the segment and a check valve feeding the cylinder with liquid having a small feed passage therethrough and adapted to give a quick exhaust of the liquid whereby the segment-operating piston of the cylinder will have a slow feed and a quick return by gravity.

20. In a pipe bending machine the combination with a bending segment and a rack and hydraulic cylinder and piston for operating the bending segment in a vertical plane, of a single supply and exhaust pipe for the cylinder and a valve in said pipe having a small and adjustable passage therethrough to feed the liquid, and being capable of raising as a whole to allow a quick escapement and return of the piston and bending segment by gravity.

In testimony whereof I have hereunder signed my name in the presence of the two subscribed witnesses.

GEO. H. REYNOLDS.

Witnesses:
G. H. MITCHELL,
R. C. MITCHELL.